(12) United States Patent
Deng et al.

(10) Patent No.: US 9,020,959 B2
(45) Date of Patent: Apr. 28, 2015

(54) CONTEXTUAL SUPPORT FOR PUBLISH-SUBSCRIBE SYSTEMS

(75) Inventors: Yu Deng, Hawthorne, NY (US); Jenny S. Li, Poughkeepsie, NY (US); Liangzhao Zeng, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 12/632,134

(22) Filed: Dec. 7, 2009

(65) Prior Publication Data

US 2011/0137950 A1    Jun. 9, 2011

(51) Int. Cl.
    *G06F 17/30*     (2006.01)
    *G06Q 30/02*     (2012.01)

(52) U.S. Cl.
    CPC ........................... *G06Q 30/02* (2013.01)

(58) Field of Classification Search
    USPC .................. 707/754, 780, 999.001, 999.003, 707/999.005
    See application file for complete search history.

(56) References Cited

U.S. PATENT DOCUMENTS

| | | | |
|---|---|---|---|
| 2006/0129907 A1 | 6/2006 | Volk et al. | |
| 2006/0129917 A1 | 6/2006 | Volk et al. | |
| 2008/0172370 A1* | 7/2008 | Farouki ............................ | 707/5 |
| 2008/0294644 A1 | 11/2008 | Liu et al. | |
| 2009/0049540 A1* | 2/2009 | Khalil et al. .................... | 726/14 |
| 2009/0094232 A1* | 4/2009 | Marvit et al. .................... | 707/5 |
| 2009/0150479 A1* | 6/2009 | Eberlein et al. ................ | 709/203 |
| 2010/0042592 A1* | 2/2010 | Stolz et al. ...................... | 707/3 |

FOREIGN PATENT DOCUMENTS

| | | |
|---|---|---|
| JP | 09101990 A | 4/1997 |
| JP | 2005352874 A | 12/2005 |
| JP | 2007286817 A | 11/2007 |
| JP | 2007531122 A | 11/2007 |
| JP | 2008108105 A | 5/2008 |
| JP | 2008117163 A | 5/2008 |
| JP | 2008226204 A | 9/2008 |
| JP | 2009093535 A | 4/2009 |

OTHER PUBLICATIONS

Saias, Jose, et al.; A Proposal for an Ontology Supported News Reader and Question-Answer System; Universidade de Evora, Portugal.

Attensa :: Enterprise Information Delivery; http://www.attensa.com/; retrieved Oct. 23, 2009; 1 page.

(Continued)

*Primary Examiner* — Syed Hasan
(74) *Attorney, Agent, or Firm* — Cantor Colburn LLP; William A. Kinnaman, Jr.

(57) ABSTRACT

A method for providing contextual support for a publish-subscribe system includes the steps of receiving a user-defined objective of subscription relating to a topic provided from a subscriber to the publish-subscribe system, and determining one or more topics related to the subscriber provided objective of subscription. The method also includes the steps of filtering through a plurality of feeds related to the subscriber provided objective of subscription fed to the publish-subscribe system from one or more feed sources to provide a filtered list of feeds, aggregating through the filtered list of feeds to provide an aggregated list of feeds, and inferencing through the aggregated list of feeds to determine one or more of the plurality feeds that are relevant to the subscriber provided objective of subscription.

16 Claims, 6 Drawing Sheets

(56) References Cited

OTHER PUBLICATIONS

Cilia, M., et al.; Dealing With Heterogeneous Data in Pub/Sub Systems: The Concept-Based Approach; Databases and Distributed Systems, Dept. of Computer Sicence, Technische Universitat Darmstadt, Darmstadt, Germany.

Expedia RSS Feeds; New:Get Deals via RSS (beta); http://www.expedia.com/daily/outposts/rss/expedia_rss.asp?CCheck=1&; retrieved Oct. 23, 2009; 1 page.

Petrovic, Milenko, et al.; S-TOPSS: Semantic Toronto Publish/Subscribe System; Department of Electrical and Computer Engineering and Department of Computer Science, Univeristy of Toronto, Canada; Proceedings of the 29th VLDB Conference; Berlin, Germany; 2003.

Rao, Leena; Trackle Feeds You Personalized RSS; Feb. 10, 2009; http://www.techcrunch.com/2009/02/10/trackle-feeds-you-personalized-rss/; retrieved Oct. 23, 2009; 1 page.

Ivan Cantador et al., "Semantic Contextualisation in a News Recommender System," International Workshop on Context-Aware Recommender Systems; Proceedings of the Third ACM Conference on Recommender Systems; 2009.

Norberto Fernandez et al., "NEWS: Bringing Semantic Web Technologies into News Agencies," The Semantic Web—ISWC 2006.

International Search Report; International Application No. PCT/EP2010/065895; International Filing Date: Oct. 21, 2010; Date of Mailing: Feb. 21, 2011.

International Search Report—Written Opinion; International Application No. PCT/EP2010/065895; International Filing Date: Oct. 21, 2010; Date of Mailing: Feb. 21, 2011.

Raphael Troncy—Amit Sheth et al., "Bringing the IPTC News Architecture into the Semantic Web," The Semantic Web—ISWC 2008.

Felipe M. Villoria et al., "Powering RSS Aggregators with Ontologies: A Case for the RSSOwl Aggregator," International Conference on Enterprise Information Systems ICEIS; 2006.

* cited by examiner

CONTEXTUAL SUPPORT FOR PUBLISH-SUBSCRIBE SYSTEMS

BACKGROUND

The present invention relates to publish-subscribe systems and, more specifically, to a publish-subscribe system such as RSS ("Really Simple Syndication") having contextual support for improved locating of user-relevant articles of interest from a plurality of article feed sources.

Current Internet or World Wide Web ("Web") publish-subscribe ("pub-sub") systems such as RSS and Atom enable users to subscribe to selected information from various web sources. Usually, the RSS system is set up in a one-to-one relationship, i.e., one user subscription is assigned to each article feed source. Thus, if the user wants information from different feed sources, the user must separately subscribe to each desired feed source. An RSS feed source, which is typically made available on the Web at various well-known content provider websites, contains summary details of website content, such as news items or blog entries. The data can be extracted from the RSS feed source and presented on other websites or accessed directly by Internet users using an RSS reader. Then, if an RSS item looks interesting to the user, the user can click on the link provided to enable the user to go to the originating website and read the full item. Invariably in these publish-subscribe systems the user is limited to subscribing to articles of interest by topic or keyword only. Thus, searching and locating articles of interest is typically limited in that it is performed by searching of topic-related keywords in the title of the article.

This type of arrangement has other limitations, for example a lack of intelligence for contextual support within the RSS reader in the RSS system. Current RSS systems are usually syntax-based, i.e., the published page is considered as a string (e.g., HTML or XML format) by the RSS reader. Typically there are no semantic-based operations supported by RSS readers. An exemplary semantic operation is sorting the release sale price for all of a particular new type of digital camera. Without such an operation, users are required to read all the published pages and sort the camera price manually themselves. This often causes the user to review thousands of articles that are returned based on the user's selected topic of interest. From a practical point of view, this is an unmanageable and a non-user friendly situation for the user.

The limitations with this type of publish-subscribe system also include a lack of aggregation of a collection of articles from different feed sources that are relevant to the user's interest or purpose of reading. Current RSS systems are commonly limited to aggregating articles from a single RSS feed source that share the same keyword in the title. Another limitation is the inability to filter articles to find the useful information that the user is seeking. Even further, the limitations include a lack of inference support such as inferring a car brand from articles that talk about a car model within that brand where the article does not mention the brand. Also, current publish-subscribe systems typically have no summary report or recommendation capability to assist the user in making a decision. These limitations all go towards the lack of ability for the user of an RSS system to locate only those articles that are relevant to the user's interest or purpose of reading.

As an example, a user who subscribed to a topic labeled "real estate" may be interested only in finding the least expensive mortgage interest rate so the user can decide if the user can afford to buy a particular house. However, since the user has subscribed to all "real estate" articles from various web sources by topic, the user's RSS reader may be flooded with a relatively large amount of articles per day, and typically only a small number of them are related to the mortgage interest rate that the user is interested in. This causes a lot of time and effort for the user to locate the exact information the user is seeking and is most useful to the user (i.e., the least expensive mortgage rate). As such, the user may eventually get frustrated and give up on the particular publish-subscribe system.

BRIEF SUMMARY

According to one embodiment of the present invention, a method for providing contextual support for a publish-subscribe system includes the steps of receiving a user-defined objective of subscription relating to a topic provided from a subscriber to the publish-subscribe system, and determining one or more topics related to the subscriber provided objective of subscription. The method also includes the steps of filtering through a plurality of feeds related to the subscriber provided objective of subscription fed to the publish-subscribe system from one or more feed sources to provide a filtered list of feeds, aggregating through the filtered list of feeds to provide an aggregated list of feeds, and inferencing through the aggregated list of feeds to determine one or more of the plurality feeds that are relevant to the subscriber provided objective of subscription.

Other embodiments of the present invention include a system and a computer program product that embody the aforementioned method embodiment of the present invention in the paragraph directly above.

According to another embodiment of the present invention, a method for providing contextual support for a publish-subscribe system includes the steps of receiving a user-defined objective of subscription relating to a topic provided from a subscriber to the publish-subscribe system, and using an ontology engine to determine one or more topics related to the subscriber provided objective of subscription, the one or more topics related to the subscriber provided objective of subscription being stored in an ontology repository. The method also includes the steps of filtering through a plurality of feeds related to the subscriber provided objective of subscription fed to the publish-subscribe system from one or more feed sources to provide a filtered list of feeds, and aggregating through the filtered list of feeds to provide an aggregated list of feeds. The method further includes the steps of inferencing through the aggregated list of feeds to determine one or more of the plurality feeds that are relevant to the subscriber provided objective of subscription, and providing a report based on a result of the step of inferencing through the aggregated list of feeds to determine one or more of the plurality of feeds that are relevant to the subscriber provided objective of subscription.

DETAILED DESCRIPTION

Figure 1:
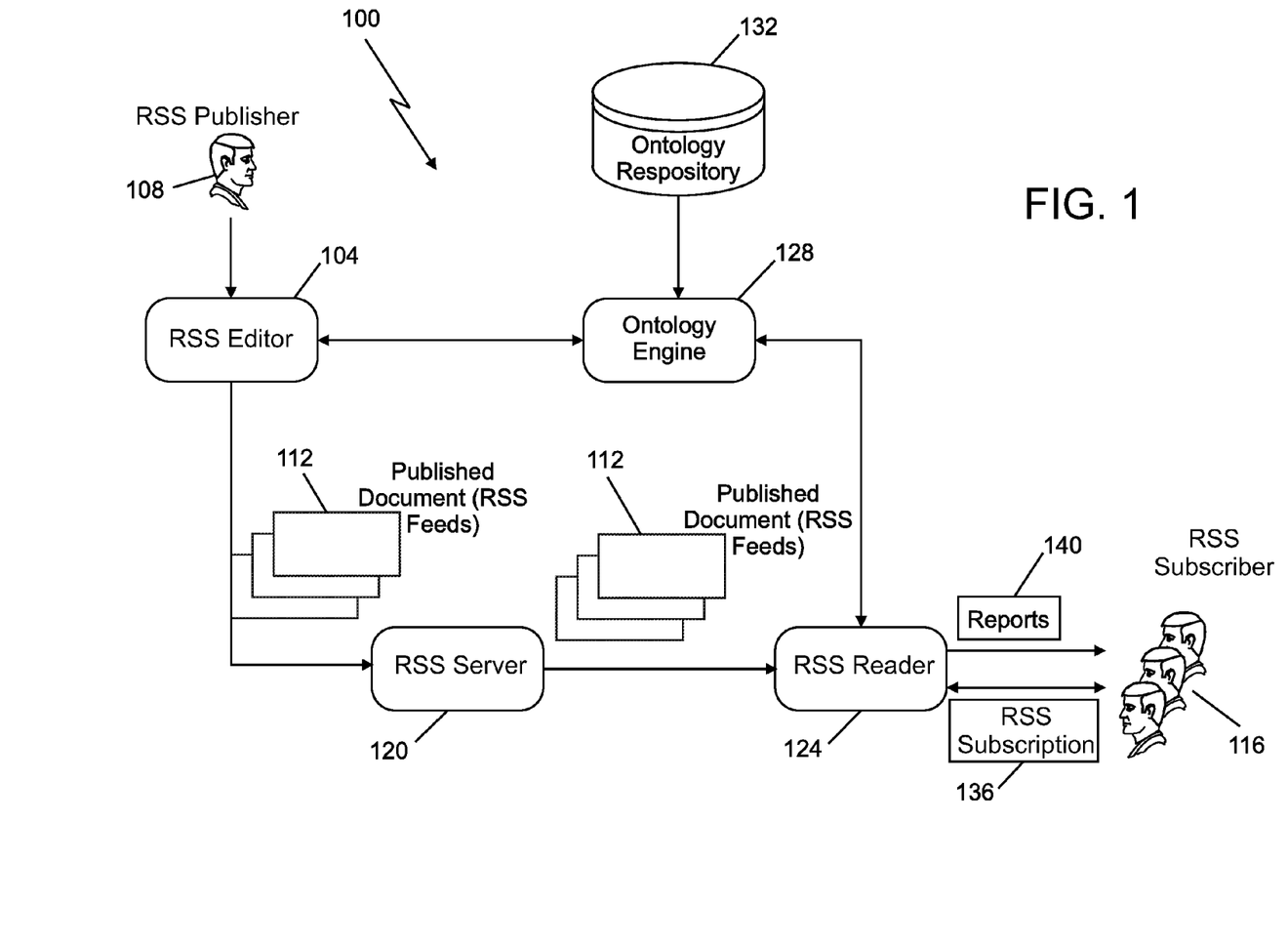
FIG. 1 is a block diagram of an RSS publish-subscribe system in which embodiments of the present invention may be located.

Referring to FIG. 1, there illustrated is a block diagram of an RSS publish-subscribe system 100 in which embodiments of the present invention may be located. However, it is to be noted that embodiments of the present invention are not limited to an RSS type publish-subscribe system. Other types of publish-subscribe systems now known (e.g., Atom) or hereinafter developed are contemplated by embodiments of the present invention. The components of the exemplary RSS publish-subscribe system 100 of FIG. 1 include an RSS editor 104, which is a user interface ("UI") that allows each of many RSS publishers 108 to publish RSS feeds 112, typically on the Internet. These feeds 112 may comprise various documents, articles, blog entries or other pieces of published information or data that a user (i.e., an RSS subscriber 116) can locate and retrieve, based on the user's objective of subscription or purpose of reading, in accordance with embodiments of the present invention. The RSS feeds 112 are in formats typically specified in XML (extensible markup language), which is a set of rules for defining documents electronically, typically for use on the Internet. An RSS server 120 allows the RSS publisher 108 to upload the RSS feeds 112, and allows an RSS reader 124 to retrieve certain ones of the RSS feeds 112 (e.g., the feeds 112 that meet the user's objective of subscription or purpose of reading). An RSS ontology engine 128 manages an ontology repository 132 (e.g., a database) and helps the RSS system 100 to provide contextual support (e.g., semantic inferencing services) for the user 116, as described in detail hereinafter. The ontology repository 132 stores ontological relationships of different potential objects of interest that are published in the RSS feeds 112, such as cameras, as described in detail hereinafter with respect to FIGS. 3 and 4. The RSS reader 124 enables the RSS subscribers 116 to subscribe to the various RSS feeds 112 through subscriptions 136 to the various RSS publishers 108. In accordance with embodiments of the present invention, the RSS reader 124 has aggregation and inferencing capabilities on the RSS feeds 112, and eventually locates and provides the relevant articles to the user 116, which may be in the form of composite reports 140.

Figure 2:
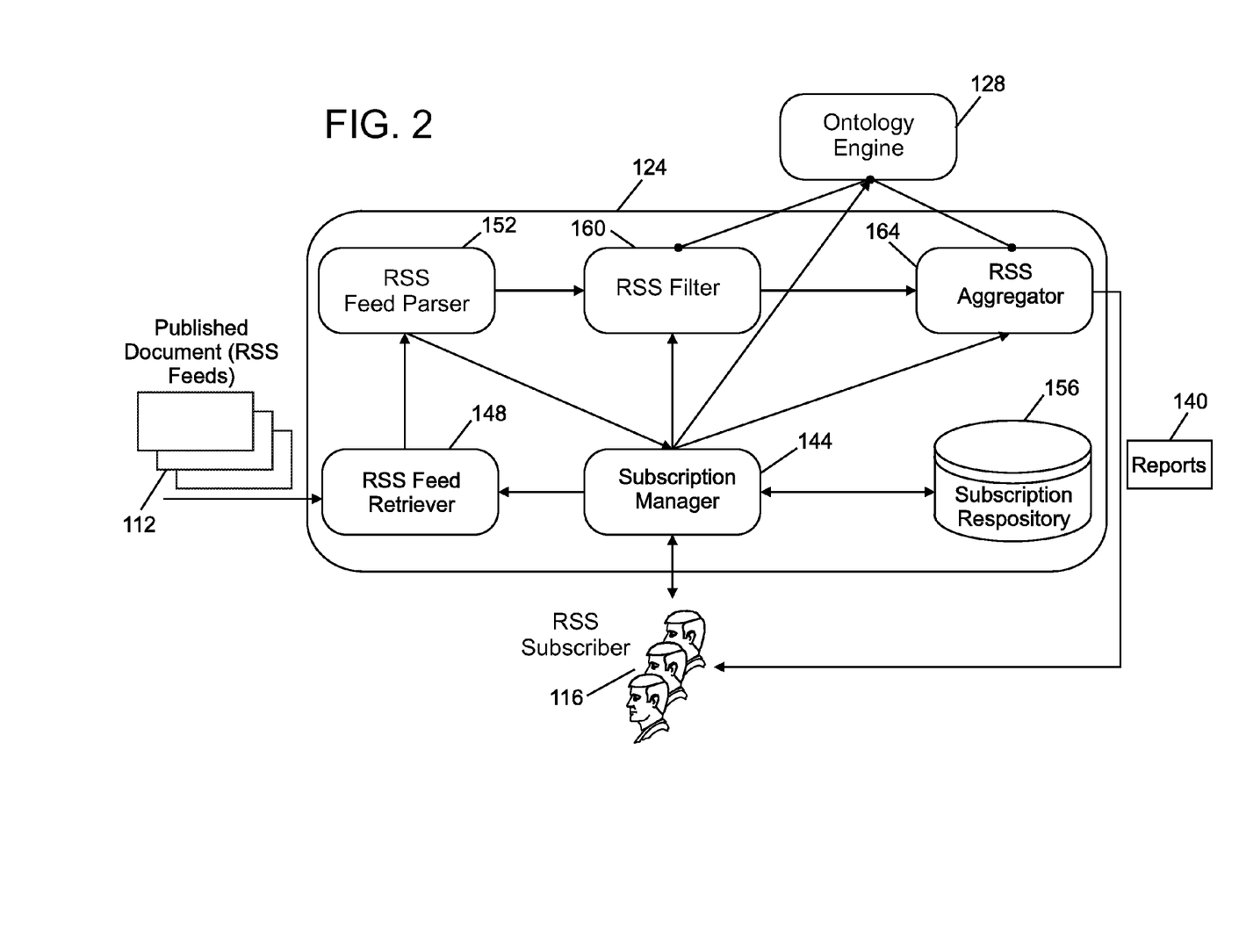
FIG. 2 is a block diagram of a portion of the RSS system of FIG. 1 in which embodiments of the present invention may be located.

Referring also to FIG. 2, there illustrated is a block diagram of a portion of the RSS system 100 of FIG. 1 in which embodiments of the present invention may be located. More specifically, FIG. 2 illustrates the various components of the RSS reader 124 in more detail in accordance with embodiments of the present invention. An embodiment of the present invention as illustrated in FIGS. 1 and 2 is described in conjunction with an exemplary flow of information within the RSS system 100 shown in those figures.

Referring to both FIGS. 1 and 2, the various RSS publishers 108 periodically post or make available new RSS feeds 112 regarding various topics or subjects. In doing so, each RSS publisher 108 uses the RSS editor 104 to provide the content of the feed 112, and the RSS editor 104 queries the ontology engine 128 to identify the appropriate stored ontology from the repository 132 that can be used to describe the particular published content. Therefore, each RSS feed 112 is associated with an ontology. An exemplary ontology with respect to a camera is described in detail hereinafter with respect to FIG. 3. Next, the RSS editor 104 submits the RSS feeds 112 to the RSS server 120.

An RSS subscriber 116 then makes a new subscription by querying the subscription manager 144 to identify any interesting RSS feeds 112 using keywords that define the user's objective of subscription or purpose of reading, or the user 116 may merely provide URLs of potentially interesting RSS feeds 112. Based on the subscriber's objective of subscription or purpose of reading, the subscription manager 144 queries the ontology engine 128 to suggest related RSS feeds 112 that the subscriber 116 may be interested in (the search can be either localized on, e.g., a private company Intranet or may be global from on the Internet). Ontology engine 128 identifies the semantics of the received objective of subscription or purpose of reading. Ontology engine 128 returns a list of related topics based on this semantics of objective of subscription or purpose of reading back to the subscription manager 144. The subscription manager 144 uses these topics of semantics from the ontology engine 128 to load the RSS feeds 112 by instructing an RSS feed retriever 148 to receive the RSS feeds 112 that contain these topics from, e.g., the Internet. An RSS feed parser 152 is utilized to parse the user-chosen feeds 112, and then the subscription manager 144 suggests a related semantic filtering operator that allows the subscriber 116 to filter out non-interesting feeds 112 based on the user's objective of subscription or purpose of reading. Also, the subscription manager 144 provides a mash-up tool that allows the subscriber to mash up multiple RSS feeds 112 into a composite report 140.

Next, the RSS subscriber 116 refreshes the subscription 136 using the subscription repository 156. The subscription manager 144 instructs the RSS feed retriever 148 to receive updated RSS feeds 112 and pass them to the RSS feed parser 152. After the RSS feeds 112 are parsed, an RSS filter 160 filters out any feeds 112 that are non-interesting to the user 116. Then an RSS aggregator 164 aggregates multiple feeds 112 into a report 140, based on the mash-up operations specified by the subscriber 116.

The current version of the RSS specification, RSS 2.0, has relatively simple syntax rules. For example, in RSS 2.0, each RSS feed has a <channel> element, under which one or more <item> elements are listed. Each <item> element has three child elements, <title>, <link> and <description>, which define an article (link) that can be digested by an RSS reader. The elements that RSS 2.0 supports are purely syntactic and only used for exchanging links RSS 2.0 only allows a brief description on the content of the articles using the <description> element, where the RSS feed publishers cannot expose any more (semantic) details on the content, such as prices of products or other similar types of detailed information. Thus, RSS systems based on RSS 2.0 typically have relatively limited "topic of interest" article search capability.

In contrast, embodiments of the present invention extend or enhance RSS systems 100 by allowing more specific user-defined elements, attributes or "tags," such as (in the context of the RSS publisher 108 providing information regarding a camera) "camera price" and "seller reputation." For example, RSS feed publishers 108 can define "camera price" as a new element <camera_price> or as an attribute to the <item> element. The inclusion of these user-defined, domain-specific tags to the RSS feeds 112 can help to identify key information within articles that is interesting to the users 116, and, thus, help the RSS system 100 to better locate an article of interest from within the RSS feeds 112 for the user 116.

In addition, embodiments of the present invention enhance the interaction capability between the user 116 and the RSS system 100 by incorporating user interfaces within the RSS reader 124, such as drop down menus. For an RSS system administrator, this type of user interface enables the administrator to configure the type of ontology engine 128 used within the RSS system 100. It also allows the administrator to configure the ontology types, for example, the RSS reader 124 can be configured to process RDF/DAML+OIL/OWL-based documents. For RSS system subscribers 116, the user interface enables users 116 to define "objectives of subscription" or "purpose of reading" in addition to topics of interest. For example, when a user 116 selects the topic "real estate" for subscription, the user can provide an objective as to why the user 116 subscribed to that topic. The user's objective may be to "find the cheapest mortgage rate." The user interface also allows the user 116 to create various criteria of articles that are interesting to the user 116 in the form of a query. For example, the user may be interested in articles about "camera price>=500 and camera price<=700," that is, camera prices between $500 and $700.

Still further, embodiments of the present invention incorporate several semantic support features within the RSS reader 124. Current RSS systems typically employ a reader that has relatively limited processing capability, and does not provide any intelligence to extract relevant information that is interesting to the user 116 who subscribed to an RSS feed 112. In contrast, embodiments of the present invention incorporate several semantic support features within the RSS reader 124, including processing capabilities within the RSS reader 124 to process the domain specific tags, and then extract the useful information. An RSS reader 124 according to embodiments of the present invention can leverage these user-defined elements, attributes or "tags" to further understand the content of the articles.

Another semantic support feature incorporated within the RSS reader 124 is interpretation capability to process the objectives of subscription from the various end users/subscribers 116. For example, a user 116 can define their "objective of subscription" to be "find the lowest mortgage rate," and the user 116 subscribes to the topic "real estate." The RSS system 100, according to embodiments of the present invention, interprets the user's objective of subscription and identifies and locates articles that have information about mortgage rates and further processes the articles that discuss the lowest mortgage rate available at that time.

Yet another semantic support feature incorporated within embodiments of the RSS reader 124 of the present invention is a query processing capability within the RSS reader 124 (similar to that discussed hereinabove with respect to the user interface), such that the reader 124 can execute a relatively simple query. For example, an RSS subscriber 116 may want to read articles related to cameras with a price between $500 and $700. With the user-defined element <camera_price>, an RSS reader 124 can execute a simple query with a condition "camera_price>=500 and camera_price<=700." To execute this query, the RSS reader 124 is able to know the type of an element (more precisely, the type of the value of an element). The RSS reader 124 according to embodiments of the present invention has this query processing capability by taking an incoming query, processing it against the source articles, RSS feeds 112, and extracting the useful information/article that is of interest to the user 116.

Other semantic support features include filtering, aggregation and inferencing capabilities included within the RSS reader 124, according to embodiments of the present invention. Currently, RSS readers have little or no intelligence to perform any inferencing operations. In contrast, embodiments of the present invention have an RSS reader 124 with filtering, aggregation and inferencing capabilities. RSS readers 124 can aggregate across multiple RSS feeds 112. For example, an RSS subscriber 116 may want to know which brand of cameras has the lowest price. Without any help from the RSS reader 124, the subscriber 116 has to read all of the articles related to cameras and compare the prices. In contrast, an RSS reader 124, according to embodiments of the present invention, may include various aggregate operators, including min, max, count, sum and average. Such aggregate operators are applicable to multiple elements, not just one element at a time. This is different from traditional aggregate operators. For example, a publisher may define an element <discount> to announce discount rates from time to time. When an RSS reader 124 computes the minimum price for all of the RSS feeds 112, it takes such factors into account, including both <camera_price> and <discount>. With this inferencing capability, an RSS reader 124 according to embodiments of the present invention is able to locate articles that are related to the user's objective of subscription. For example, if a user 116 is interested in "Japanese-made digital cameras," then when an RSS reader 124 receives an article that talks about a particular model of a camera brand that is made in China, the RSS reader 124 does not present it to the user 116. In another example, since RSS subscribers 116 may not know what elements or terms RSS publishers 108 have defined and used in the RSS feeds 112, subscribers 116 may post queries using different keywords. For example, a subscriber 116 may ask for all of the articles related to a particular car brand, but publishers 108 may only list model names of that car brand in the description. To resolve this problem, the RSS system 100 conducts inferencing on RSS feeds 112, so that it may know whether the car model is one of a particular brand of car models, and, if so, will be able to return all of the related articles to the user 116 related to that brand.

In addition, different publishers 108 may provide information with regard to the same kind of product. For example, one publisher 108 may provide the retail price of a type of camera brand, another publisher 108 may provide coupon information about the same product. An RSS reader 124, according to embodiments of the present invention, is able to correlate them together when computing the actual price of a product. That is, the RSS reader 124 understands that coupon is a kind of discount and the two publishers 108 are talking about the same product even though they may use different terms to describe it.

With an RSS system 100 having the aforementioned contextual and semantic support features, extra tags (elements) with semantic meaning can be defined that are domain specific. For example, for a new product release web page, a semantic tag "release price" can be specified. When a user 116 subscribes to a particular RSS feed 112, the RSS reader 124 loads the set of domain specific tags as filters. These domain specific tags are supplied by the ontology engine 128 with respect to the user's objective of subscription or purpose of reading. A user 116 can specify particular areas of interest within the RSS feed 112, such as "camera price," "seller reputation," etc. Therefore, the RSS reader 124 may use the semantic tag information to sort the release price. Further, the RSS reader 124 may aggregate related pages (such as the new product release page and hands-on review page) based on the semantic information and provide further inferencing on the list of articles to derive new information (such as finding the best camera price and seller reputation combination) and sort them accordingly and present them to the user 116.

The field of ontology deals with questions concerning what entities exist or can be said to exist, and how such entities can be grouped, related within a hierarchy, and subdivided according to similarities and differences. An ontology is an explicit specification of a conceptualization. It describes the classification of entities in the universe and how they are related. The entities are typically named by a set of representational terms. Axioms are associated with the terms to constrain their interpretation.

Figure 3:
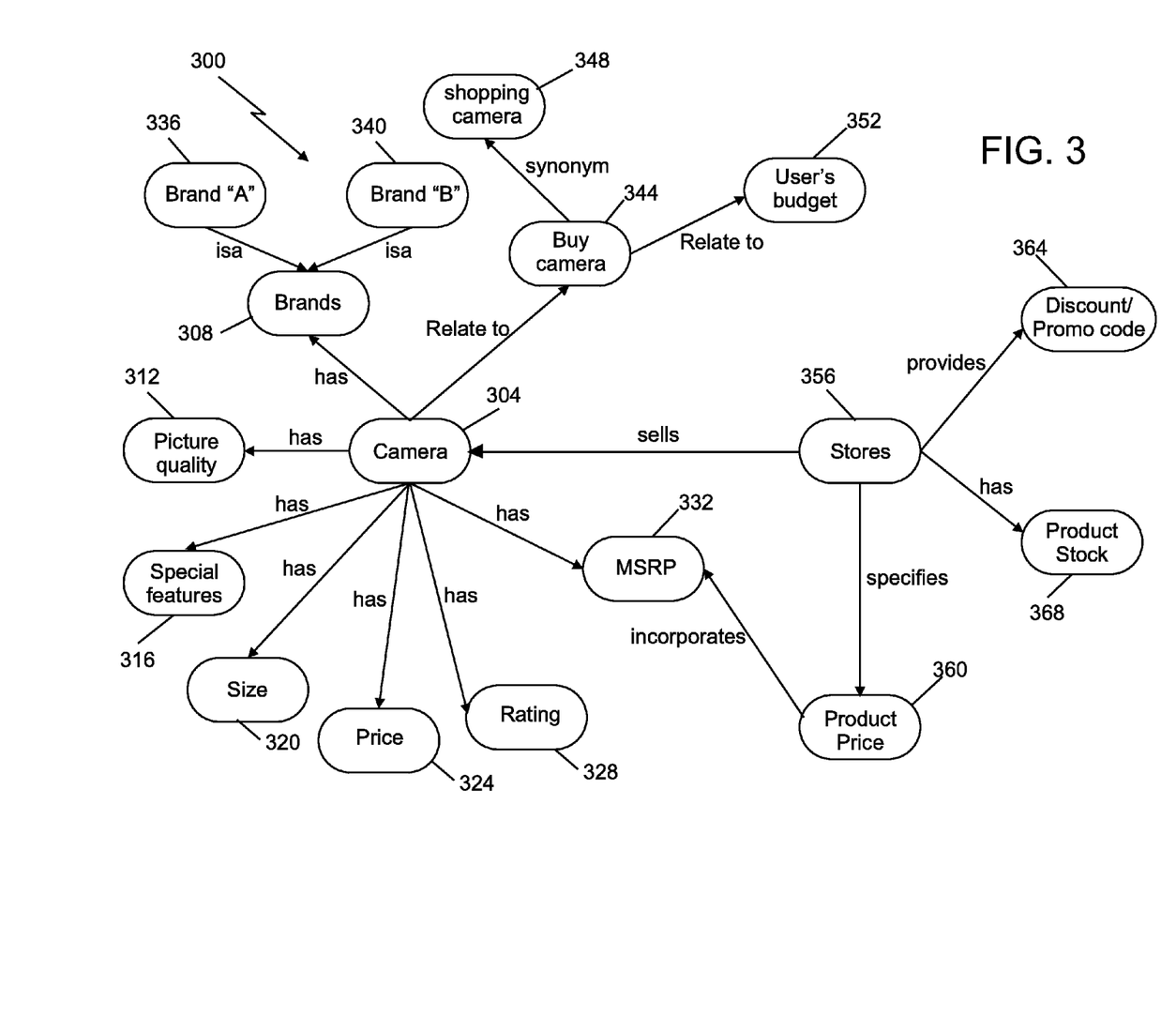
FIG. 3 is an ontology diagram of an exemplary embodiment of information regarding a camera.

FIG. 3 illustrates an ontology diagram 300 of an exemplary embodiment of information regarding a camera. For example, a camera 304 has numerous topics or attributes, including, for example, brands 308, picture quality 312, special features 316, size 320, price 324, rating 328, and manufacturer's suggested retail price ("MSRP") 332. Brand "A" 336 is a brand 308 and Brand "B" 340 is also a brand 308. Buy camera 344 relates to the camera 304, and shopping camera 348 is a synonym for buy camera 344. User's budget 352 relates to buy camera 344. Stores 356 sell cameras 304 and specify product price 360 that incorporates the MSRP 332. Also, stores 356 provide a discount/promo code 364 and have product stock 368.

Figures 4, 4A:
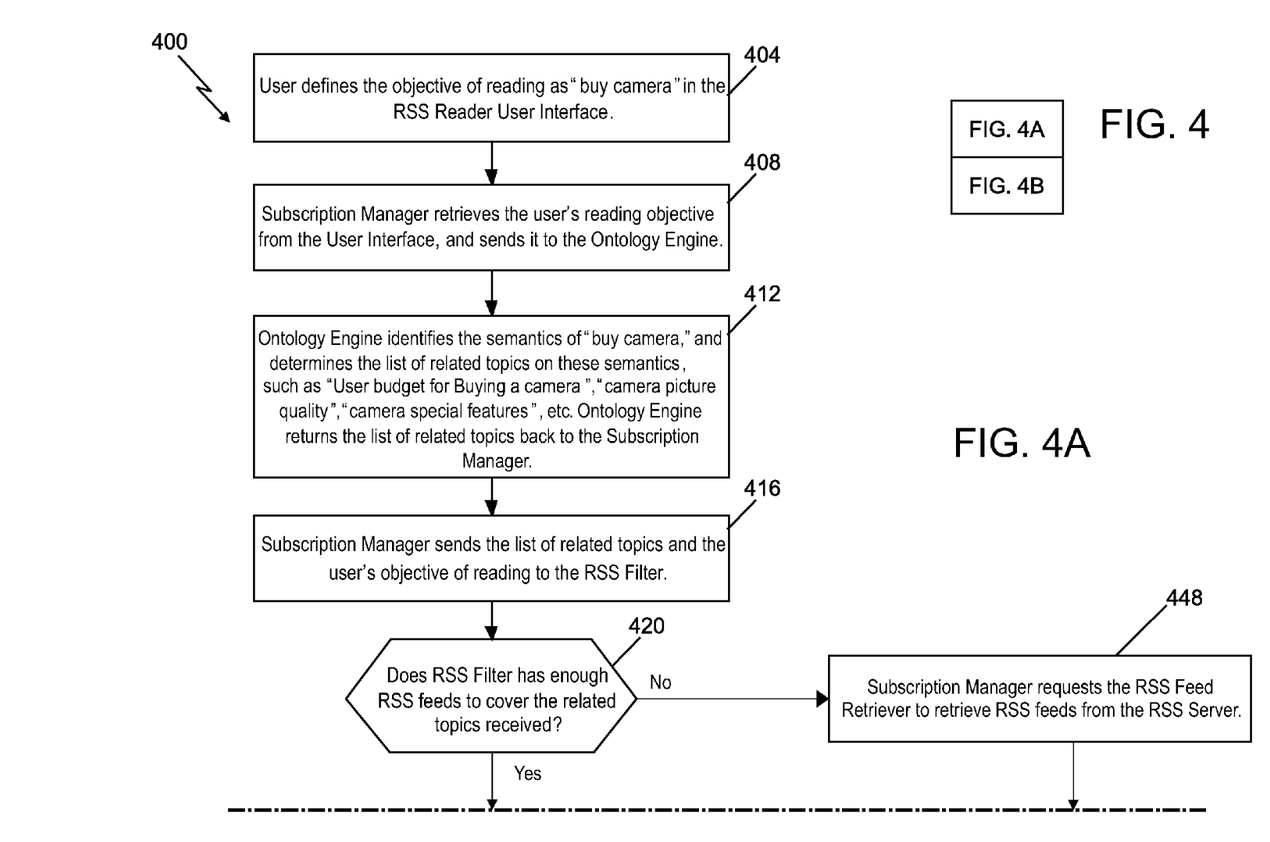
FIG. 4 is a flowchart of steps taken by an RSS system in accordance with an exemplary embodiment of the present invention in providing relevant information regarding a camera to a user of the RSS system.
Figure 4B:
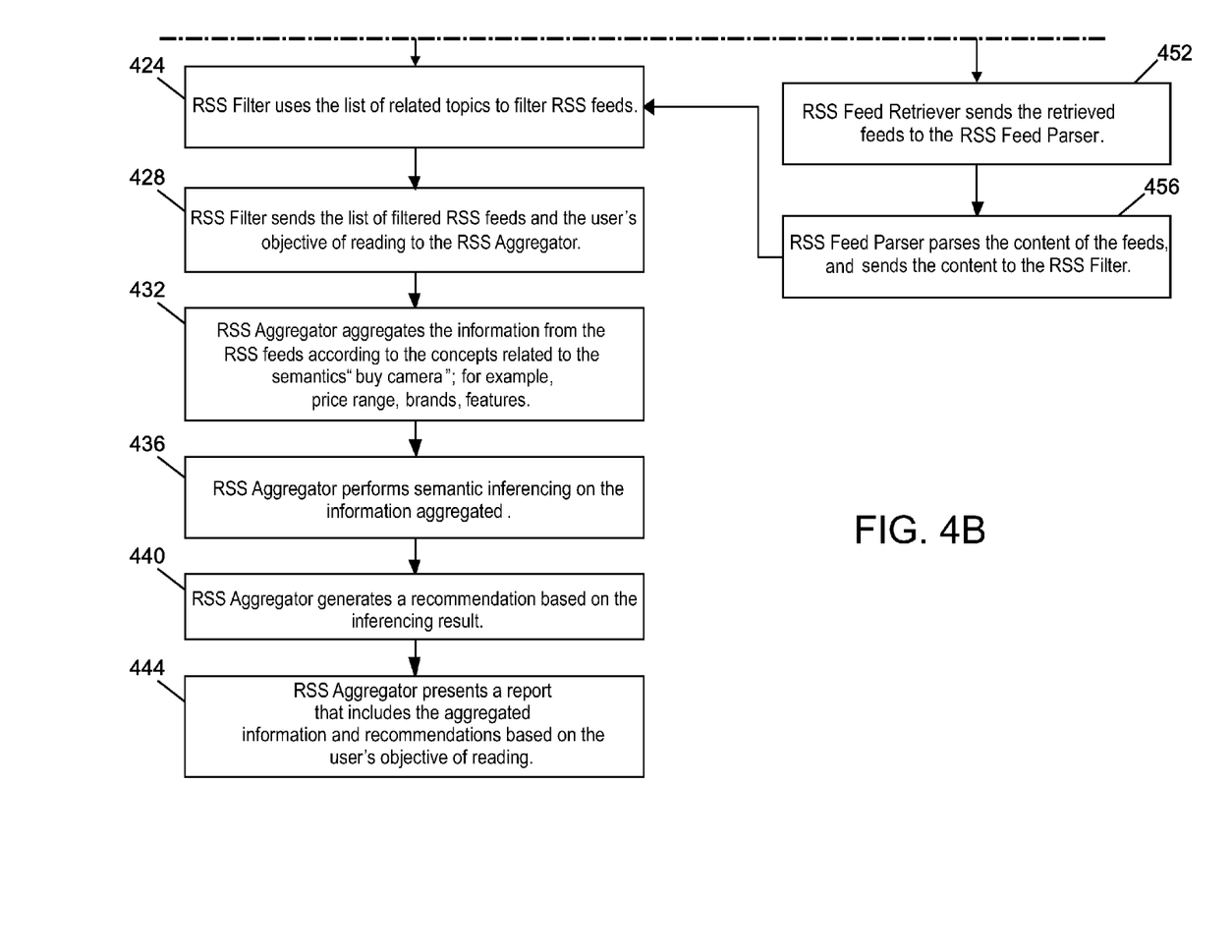

Referring to FIG. 4, there illustrated is a flowchart 400 of steps taken by an RSS system 100 (FIGS. 1 and 2) in accordance with an exemplary embodiment of the present invention in locating and providing relevant information regarding a camera to a user 116 of the RSS system 100. For example, a user 116 may want to find a camera with the "best deal," which may mean that a camera may have certain features appealing to the user 116, for example, that the camera has received good reviews, has good picture-taking features, has a good price, etc. In a step 404, the user 116 defines his/her objective of subscription or purpose of reading as "buy camera" and enters this in the RSS reader 124 user interface. This objective or purpose is used to determine the scope of articles that are related to the context of this objective or purpose. Then, in a step, 408, the subscription manager 144 (FIG. 2) receives the objective "buy camera" from the user interface and sends it to the ontology engine 128. Next, in a step 412, the ontology engine 128 identifies the semantics of "buy camera," and determines the list of related topics on these semantics, which may include "user budget for buying a camera," "camera picture quality," "camera special features," etc. The ontology engine 128 provides a list of related topics based on these semantics back to the subscription manager 144.

Next, in a step, 416, the subscription manager 144 sends the list of related topics and the user's objective of subscription to the RSS filter 160 (FIG. 2). Then, in a step 420, the system 100 checks if the RSS filter 160 has enough RSS feeds 112 to cover the related topics received. If so, the RSS filter 160 uses the list of related topics to filter the RSS feeds 112 in a step 424. Then, in a step 428, the RSS filter 160 sends the list of filtered RSS feeds 112 and the user's objective of subscription or purpose of reading to the RSS aggregator 164 (FIG. 2). In a step 432, the RSS aggregator 164 aggregates the information from the RSS feeds 112 according to the concepts related to the semantics "buy camera," for example, according to price range, brands, features, etc. Next, in a step 436, the RSS aggregator 164 performs semantic inferencing on the information aggregated. In a step 440, the RSS aggregator 164 generates a recommendation based on inferencing result. Then, in a step 444, the RSS aggregator 164 presents a report that includes the aggregated information and recommendations based on the user's objective of subscription.

If, as a result of the step 420, the RSS filter 160 does not have enough RSS feeds to cover the related topics received (e.g., "buy camera"), then in a step the subscription manager 144 requests the RSS feed retriever 148 (FIG. 2) to retrieve RSS feeds 112 from the RSS server 120 (FIG. 1). Next, in a step 452, the RSS feed retriever 148 sends the retrieved feeds 112 to the RSS feed parser 152, which parses the content of the feeds in a step 456 and sends the content to the RSS filter 160. The flowchart 400 of FIG. 4 then branches to the step 424 where the RSS filter 160 uses the list of related topics to filter the RSS feeds 112.

Embodiments of the invention are applicable not only to the Internet or Web-based applications, but also to private Intranet or other types of networks. Also, embodiments of the invention are applicable to any textual information sharing systems that have publish-subscribe capabilities such as RSS feeds, for example, broadcast television channels.

Embodiments of the present invention allow for a publish-subscribe system, such as an RSS system 100, to include contextual and semantic support for the subscribers or users 116, in part through use of an enhanced RSS reader 124. Contextual support includes, for example, "smart" filtering, reporting, aggregation and inferencing capabilities, which all enable a user 116 to better receive information related to the user's objective of subscription or purpose of reading, not just the user's topics of interest.

Embodiments of the present invention provide for the RSS feed source or publisher 108 to include domain-specific tags that enable an RSS reader 124 to better understand the incoming articles. As a result, an RSS feed subscriber 116 is better able to define query/selection criteria of articles that are of interest to the user 116. Based on the user-defined query, the RSS reader 124 can perform filtering, aggregation and inferencing operations on the RSS feeds 112, and select and aggregate the articles that are the most relevant to the user's interest, or generate reports to summarize information from multiple RSS feeds 112. The RSS system 100, in accordance with embodiments of the present invention, enables users 116 to better define their interest or purpose of reading, and further provide an analytical system that can filter, report, aggregate and inference the articles that are most relevant to the objectives of the users for their subscriptions. In particular, the RSS system 100 can aggregate a collection of articles of different topics and sources, and apply logical operations or logic to derive new information that is relevant to the user. Enriching the RSS system 100 according to embodiments of the present invention with contextual semantic and inferencing support provides benefits to the users 116. In particular, it can save them time from reading every single article for relevant information, since the RSS reader 124 can filter, aggregate, and inference a collection of articles from multiple sources 108 that are relevant to the user's objectives of subscription or purpose of reading.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
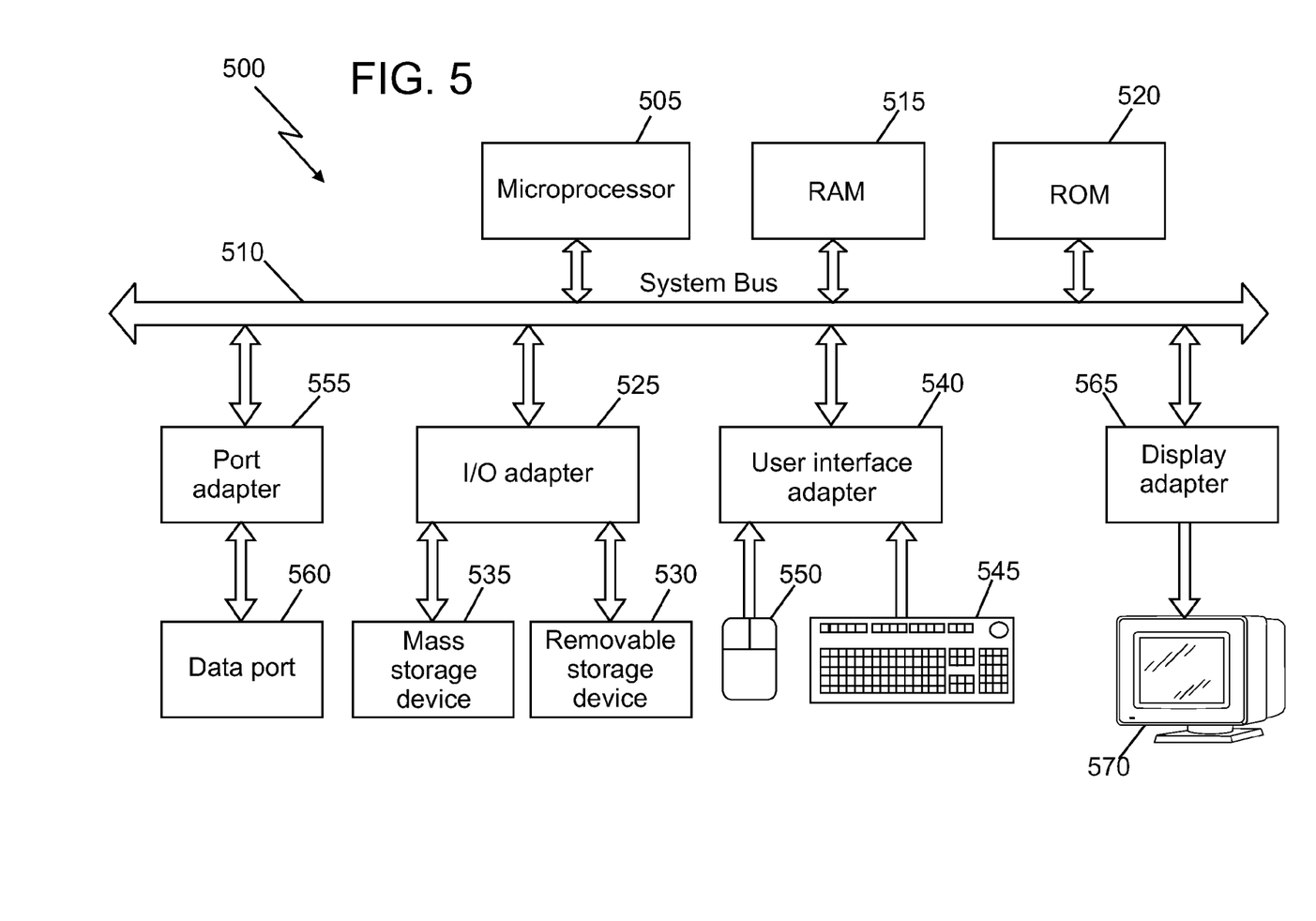
FIG. 5 is a schematic block diagram of a general-purpose computer suitable for practicing embodiments of the present invention.

Referring now to FIG. 5, computer system 500 has at least one microprocessor or central processing unit (CPU) 505. CPU 505 is interconnected via a system bus 510 to a random access memory (RAM) 515, a read-only memory (ROM) 520, an input/output (I/O) adapter 525 for a connecting a removable data and/or program storage device 530 and a mass data and/or program storage device 535, a user interface adapter 540 for connecting a keyboard 545 and a mouse 550, a port adapter 555 for connecting a data port 560 and a display adapter 565 for connecting a display device 570.

ROM 520 contains the basic operating system for computer system 500. The operating system may alternatively reside in RAM 515 or elsewhere as is known in the art. Examples of removable data and/or program storage device 530 include magnetic media such as floppy drives and tape drives and optical media such as CD ROM drives. Examples of mass data and/or program storage device 535 include hard disk drives and non-volatile memory such as flash memory. In addition to keyboard 545 and mouse 550, other user input devices such as trackballs, writing tablets, pressure pads, microphones, light pens and position-sensing screen displays may be connected to user interface 540. Examples of display devices include cathode-ray tubes (CRT) and liquid crystal displays (LCD).

A computer program with an appropriate application interface may be created by one of skill in the art and stored on the system or a data and/or program storage device to simplify the practicing of embodiments of the invention. In operation, information for, or the computer program created to run, embodiments of the present invention is loaded on the appropriate removable data and/or program storage device 530, fed through data port 560 or typed in using keyboard 545.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for providing contextual support for a publish-subscribe system, the method comprising the steps of:
receiving, by an RSS reader, a user-defined objective of subscription relating to a topic provided from a subscriber to the publish-subscribe system;
determining, by an ontology engine, one or more topics related to the subscriber provided objective of subscription, wherein the ontology engine identifies semantics of the subscriber provided objective of subscription and determines the one or more topics related to the subscriber provided objective of subscription based on the identified semantics of the subscriber provided objective of subscription;
determining if the RSS reader includes feeds related each of the one or more topics related to the subscriber provided objective of subscription;
based on determining that the RSS reader does not include feeds related each of the one or more topics related to the subscriber provided objective of subscription, requesting additional feeds that include the one or more topics;
filtering through a plurality of feeds related to the subscriber provided objective of subscription fed to the publish-subscribe system from one or more feed sources to provide a filtered list of feeds, wherein each of the plurality of feeds includes domain-specific tags provided by the ontology engine and wherein the domain specific tags are loaded by the RSS reader as filters;
aggregating through the filtered list of feeds to provide an aggregated list of feeds according to the one or more topics related to the subscriber provided objective of subscription; and
inferencing through the aggregated list of feeds to determine one or more of the plurality feeds in the aggregated list that are relevant to the subscriber provided objective of subscription, wherein the step of inferencing includes observing a relationship between at least two domain-specific tags of a feed.

2. The method of claim 1, wherein the publish-subscribe system comprises a Really Simple syndication system.

3. The method of claim 1, further comprising the step of providing a report that includes recommendations based on a result of the step of inferencing through the aggregated list of feeds to determine one or more of the plurality of feeds that are relevant to the subscriber provided objective of subscription.

4. The method of claim 1, wherein the step of receiving a user-defined objective of subscription relating to a topic provided from a subscriber to the publish-subscribe system includes the step of receiving a user-defined query related to the subscriber provided objective of subscription.

5. A computer program product for providing contextual support for a publish-subscribe system, the computer program product comprising:
a computer readable storage medium having computer readable program code embodied therewith, the computer readable program code comprising:
computer readable program code configured to implement a method for providing contextual support for a publish-subscribe system, the method further including the steps of
receiving, by an RSS reader, a user-defined objective of subscription relating to a topic provided from a subscriber to the publish-subscribe system;
determining, by an ontology engine, one or more topics related to the subscriber provided objective of subscription, wherein the ontology engine identifies semantics of the subscriber provided objective of subscription and determines the one or more topics related to the subscriber provided objective of subscription based on the identified semantics of the subscriber provided objective of subscription;
determining if the RSS reader includes feeds related each of the one or more topics related to the subscriber provided objective of subscription;
based on determining that the RSS reader does not include feeds related each of the one or more topics related to the subscriber provided objective of subscription, requesting additional feeds that include the one or more topics;
filtering through a plurality of feeds related to the subscriber provided objective of subscription fed to the publish-subscribe system from one or more feed sources to provide a filtered list of feeds, wherein each of the plurality of feeds includes domain-specific tags provided by the ontology engine and wherein the domain specific tags are loaded by the RSS reader as filters;
aggregating through the filtered list of feeds to provide an aggregated list of feeds according to the one or more topics related to the subscriber provided objective of subscription; and
inferencing through the aggregated list of feeds to determine one or more of the plurality feeds in the aggregated list that are relevant to the subscriber provided objective of subscription, wherein the step of inferencing includes observing a relationship between at least two domain-specific tags of a feed.

6. The computer program product of claim 5, wherein the publish-subscribe system comprises a Really Simple syndication system.

7. The computer program product of claim 5, further comprising the step of providing a report that includes recommendations based on a result of the step of inferencing through the aggregated list of feeds to determine one or more of the plurality of feeds that are relevant to the subscriber provided objective of subscription.

8. The computer program product of claim 5, wherein the step of receiving a user-defined objective of subscription relating to a topic provided from a subscriber to the publish-subscribe system includes the step of receiving a user-defined query related to the subscriber provided objective of subscription.

9. A system, comprising:
a computing network including a processing device in communication with one or more computer memory storage devices; and the computing network further configured to implement a method for providing contextual support for a publish-subscribe system, the method further including the steps of receiving, by an RSS reader, a user-defined objective of subscription relating to a topic provided from a subscriber to the publish-subscribe system;

determining, by an ontology engine, one or more topics related to the subscriber provided objective of subscription, wherein the ontology engine identifies semantics of the subscriber provided objective of subscription and determines the one or more topics related to the subscriber provided objective of subscription based on the identified semantics of the subscriber provided objective of subscription;

determining if the RSS reader includes feeds related each of the one or more topics related to the subscriber provided objective of subscription;

based on determining that the RSS reader does not include feeds related each of the one or more topics related to the subscriber provided objective of subscription, requesting additional feeds that include the one or more topics;

filtering through a plurality of feeds related to the subscriber provided objective of subscription fed to the publish-subscribe system from one or more feed sources to provide a filtered list of feeds, wherein each of the plurality of feeds includes domain-specific tags provided by the ontology engine and wherein the domain specific tags are loaded by the RSS reader as filters;

aggregating through the filtered list of feeds to provide an aggregated list of feeds according to the one or more topics related to the subscriber provided objective of subscription; and inferencing through the aggregated list of feeds to determine one or more of the plurality feeds in the aggregated list that are relevant to the subscriber provided objective of subscription, wherein the step of inferencing includes observing a relationship between at least two domain-specific tags of a feed.

10. The system of claim 9, wherein the publish-subscribe system comprises a Really Simple syndication system.

11. The system of claim 9, further comprising the step of providing a report that includes recommendations based on a result of the step of inferencing through the aggregated list of feeds to determine one or more of the plurality of feeds that are relevant to the subscriber provided objective of subscription.

12. The system of claim 9, wherein the step of receiving a user-defined objective of subscription relating to a topic provided from a subscriber to the publish-subscribe system includes the step of receiving a user-defined query related to the subscriber provided objective of subscription.

13. A method for providing contextual support for a publish-subscribe system, the method comprising the steps of:

receiving, by an RSS reader, a user-defined objective of subscription relating to a topic provided from a subscriber to the publish-subscribe system;

using an ontology engine to determine one or more topics related to the subscriber provided objective of subscription, the one or more topics related to the subscriber provided objective of subscription being stored in an ontology repository, wherein the ontology engine identifies semantics of the subscriber provided objective of subscription and determines the one or more topics related to the subscriber provided objective of subscription based on the identified semantics of the subscriber provided objective of subscription;

determining if the RSS reader includes feeds related each of the one or more topics related to the subscriber provided objective of subscription;

based on determining that the RSS reader does not include feeds related each of the one or more topics related to the subscriber provided objective of subscription, requesting additional feeds that include the one or more topics;

filtering through a plurality of feeds related to the subscriber provided objective of subscription fed to the publish-subscribe system from one or more feed sources to provide a filtered list of feeds, wherein each of the plurality of feeds includes domain-specific tags provided by the ontology engine and wherein the domain specific tags are loaded by the RSS reader as filters;

aggregating through the filtered list of feeds to provide an aggregated list of feeds according to the one or more topics related to the subscriber provided objective of subscription;

inferencing through the aggregated list of feeds to determine one or more of the plurality feeds in the aggregated list that are relevant to the subscriber provided objective of subscription, wherein the step of inferencing includes observing a relationship between at least two domain-specific tags of a feed; and providing a report based on a result of the step of inferencing through the aggregated list of feeds to determine one or more of the plurality of feeds that are relevant to the subscriber provided objective of subscription.

14. The method of claim 13, wherein the publish-subscribe system comprises a Really Simple syndication system.

15. The method of claim 13, wherein the step of receiving a user-defined objective of subscription relating to a topic provided from a subscriber to the publish-subscribe system plurality the step of receiving a user-defined query related to the subscriber provided objective of subscription.

16. The method of claim 13, further comprising the step of providing each of the plurality of feeds with one or more domain-specific tags related to information associated with each of the plurality of feeds.

* * * * *